(12) United States Patent
Barlow

(10) Patent No.: US 11,034,282 B2
(45) Date of Patent: Jun. 15, 2021

(54) VEHICLE ATTACHABLE CARGO RACK ASSEMBLY

(71) Applicant: Carroll Barlow, Brookhaven, MS (US)

(72) Inventor: Carroll Barlow, Brookhaven, MS (US)

(*) Notice: Subject to any disclaimer, the term of this patent is extended or adjusted under 35 U.S.C. 154(b) by 236 days.

(21) Appl. No.: 16/448,031

(22) Filed: Jun. 21, 2019

(65) Prior Publication Data
US 2020/0398733 A1 Dec. 24, 2020

(51) Int. Cl.
B60R 9/06 (2006.01)
B60P 3/41 (2006.01)
B60D 1/02 (2006.01)
B60D 1/58 (2006.01)
B60D 1/52 (2006.01)
B60D 1/14 (2006.01)

(52) U.S. Cl.
CPC ............ B60P 3/41 (2013.01); B60D 1/025 (2013.01); B60D 1/141 (2013.01); B60D 1/52 (2013.01); B60D 1/58 (2013.01); B60R 9/06 (2013.01)

(58) Field of Classification Search
CPC ....... B60R 9/06; B60R 9/065; Y10S 224/924; B60P 1/00
See application file for complete search history.

(56) References Cited

U.S. PATENT DOCUMENTS

| 3,187,901 | A |   | 6/1965  | Wilson |                    |
|-----------|---|---|---------|--------|--------------------|
| 3,894,753 | A |   | 7/1975  | Ickes  |                    |
| 3,912,092 | A | * | 10/1975 | Bolton | B66C 23/06 414/486 |
| 4,349,213 | A |   | 9/1982  | Hirsch |                    |
| 4,725,189 | A | * | 2/1988  | Langenfeld | E02F 3/627 414/703 |
| 5,018,651 | A | * | 5/1991  | Hull | B60R 9/06 224/280 |
| 5,033,662 | A | * | 7/1991  | Godin | B60R 9/065 224/521 |
| 5,224,636 | A | * | 7/1993  | Bounds | B60R 9/06 224/281 |
| 6,022,032 | A |   | 2/2000  | Savage |                    |
| 6,244,483 | B1 | * | 6/2001 | McLemore | B60R 9/06 224/521 |
| 6,378,748 | B1 | * | 4/2002 | Cox | B60R 9/06 224/401 |
| 6,381,879 | B1 | * | 5/2002 | Bollich | E02F 5/08 172/145 |
| 6,461,095 | B1 | * | 10/2002 | Puska | B66F 9/06 224/401 |
| 6,513,690 | B1 | * | 2/2003 | Churchill | B60R 9/06 224/404 |

(Continued)

Primary Examiner — Brian D Nash

(57) ABSTRACT

A vehicle attachable cargo rack assembly for transporting firewood includes a frame comprising a base that is rectangularly shaped. A pair of end rails is coupled singly to and extends from opposing end members of the base. A front rail is coupled to a front member of the base and extends between the pair of end rails so that the frame is configured to stack pieces of wood. A hitch attachment that is coupled to the front rail is three point type and thus configured to couple to a three point hitch that is coupled to a first type of vehicle, positioning a user to lift and transport the frame. A shank that is coupled to the base and extends from the front member is configured to couple to a hitch receiver that is coupled to a second type vehicle, positioning the user to transport the frame.

15 Claims, 6 Drawing Sheets

(56) References Cited

U.S. PATENT DOCUMENTS

| | | | | |
|---|---|---|---|---|
| 6,732,892 B1* | 5/2004 | Mangrum | ............. | B60R 9/06 |
| | | | | 224/401 |
| 2001/0030216 A1* | 10/2001 | Johnson | ............. | B60R 9/10 |
| | | | | 224/519 |
| 2002/0117525 A1* | 8/2002 | Ahola | ............. | B60R 9/06 |
| | | | | 224/519 |
| 2002/0170760 A1* | 11/2002 | Witte | ............. | B62D 33/027 |
| | | | | 180/89.1 |
| 2003/0011169 A1* | 1/2003 | McCoy | ............. | B60D 1/58 |
| | | | | 280/491.2 |
| 2003/0218083 A1* | 11/2003 | Truan | ............. | A01C 15/005 |
| | | | | 239/650 |
| 2009/0205847 A1* | 8/2009 | Benoit | ............. | B60R 9/06 |
| | | | | 172/249 |
| 2010/0065595 A1 | 3/2010 | Brogden | | |
| 2012/0070259 A1* | 3/2012 | Altemeier | ............. | G05G 11/00 |
| | | | | 414/545 |

* cited by examiner

VEHICLE ATTACHABLE CARGO RACK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to cargo rack assemblies and more particularly pertain to a new cargo rack assembly for transporting firewood.

BRIEF SUMMARY OF THE INVENTION

An embodiment of the disclosure meets the needs presented above by generally comprising a frame, which comprises a base that is rectangularly shaped. A pair of end rails is coupled singly to and extends perpendicularly from opposing end members of the base. A front rail is coupled to a front member of the base and extends between the pair of end rails so that the frame is configured to stack pieces of wood. A hitch attachment that is coupled to the front rail is three point type and thus complementary to, and configured to couple to, a three point hitch that is coupled to a first type of vehicle, such as tractor, positioning a user to lift and transport the frame. A shank that is coupled to the base and extends from the front member is complementary to, and configured to couple to, a hitch receiver that is coupled to a second type vehicle, such as a pickup, sport utility vehicle, or all-terrain vehicle, positioning the user to transport the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
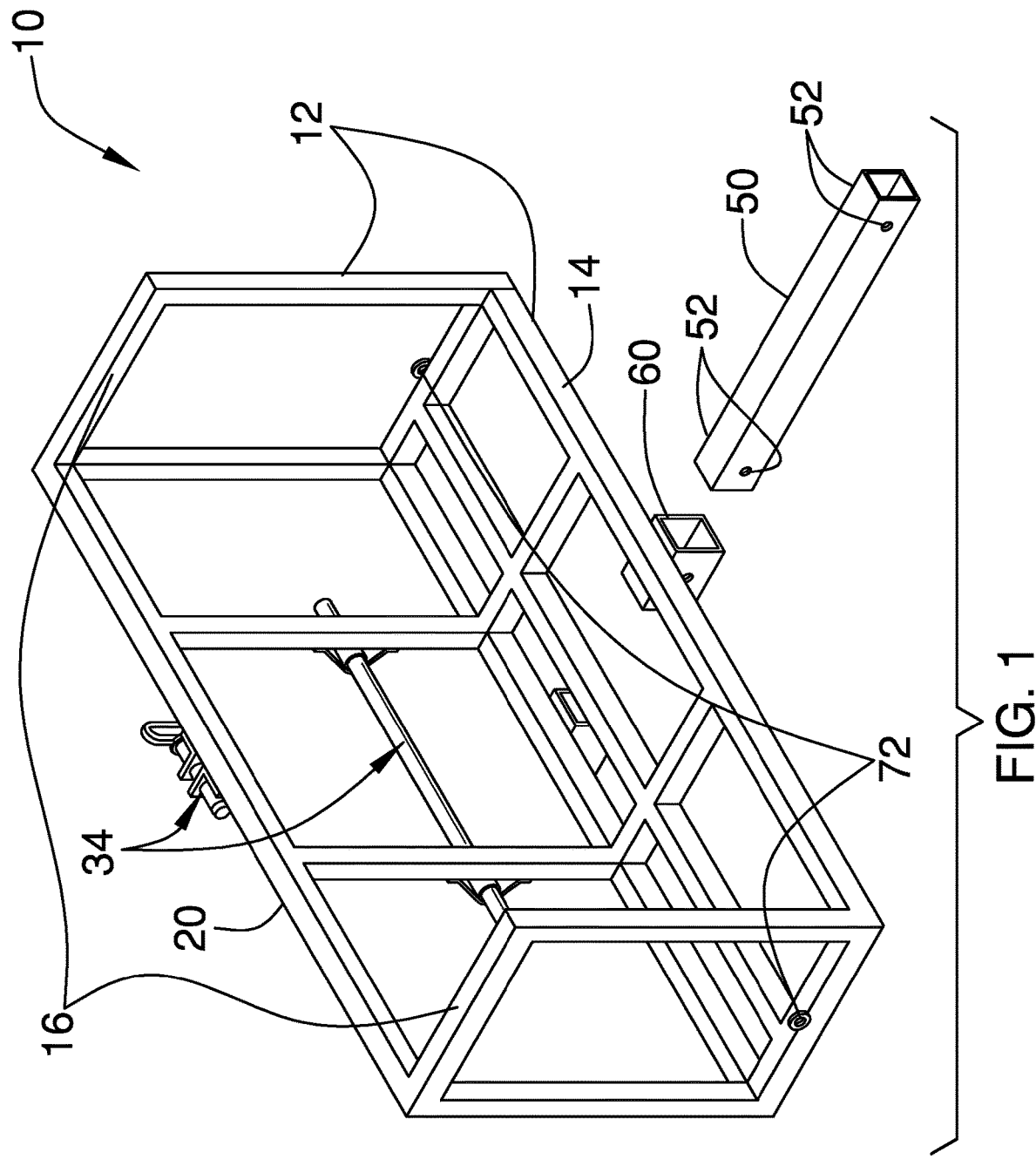
FIG. 1 is a rear isometric perspective view of a vehicle attachable cargo rack assembly according to an embodiment of the disclosure.
Figure 2:
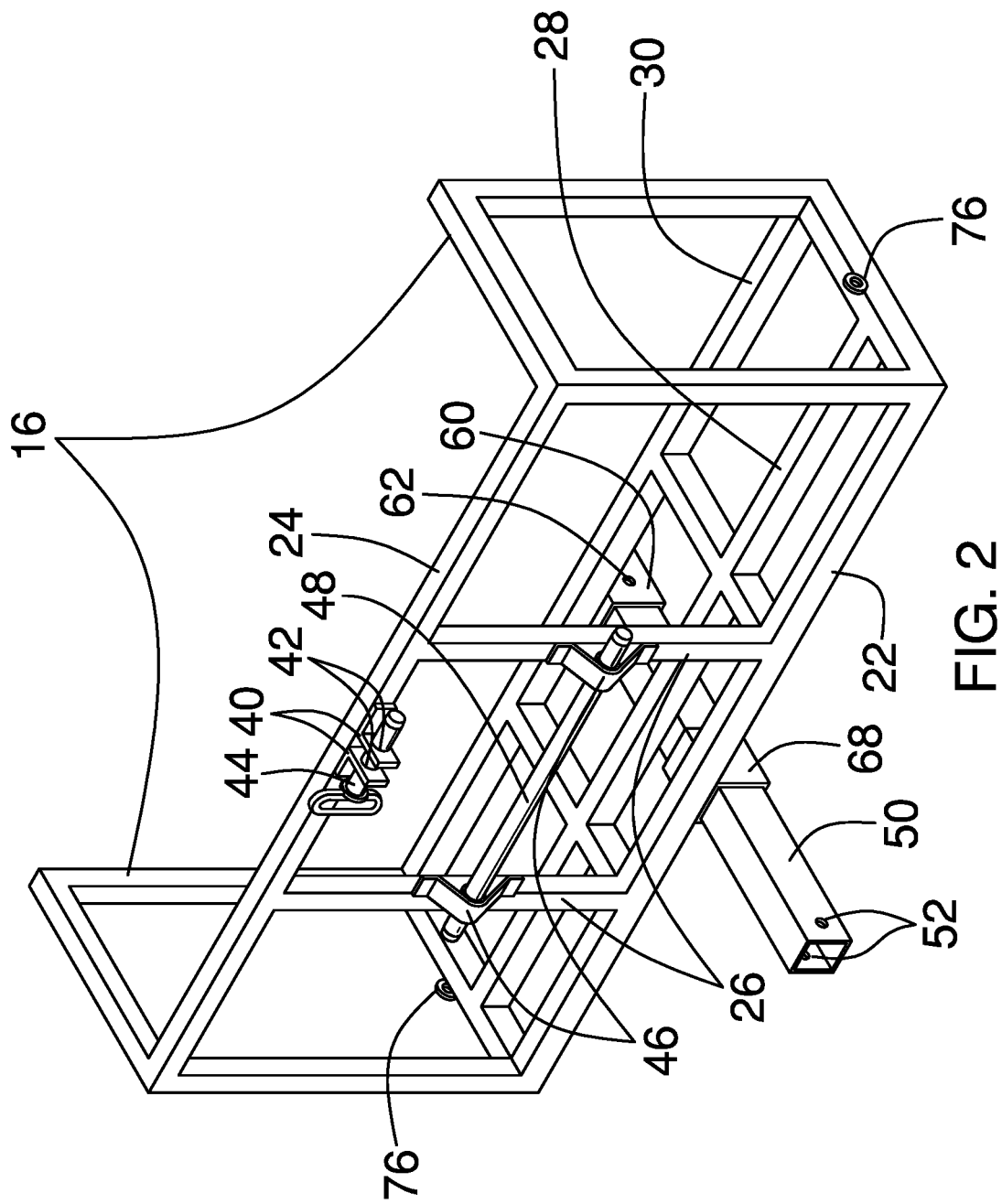
FIG. 2 is a front isometric perspective view of an embodiment of the disclosure.
Figure 3:
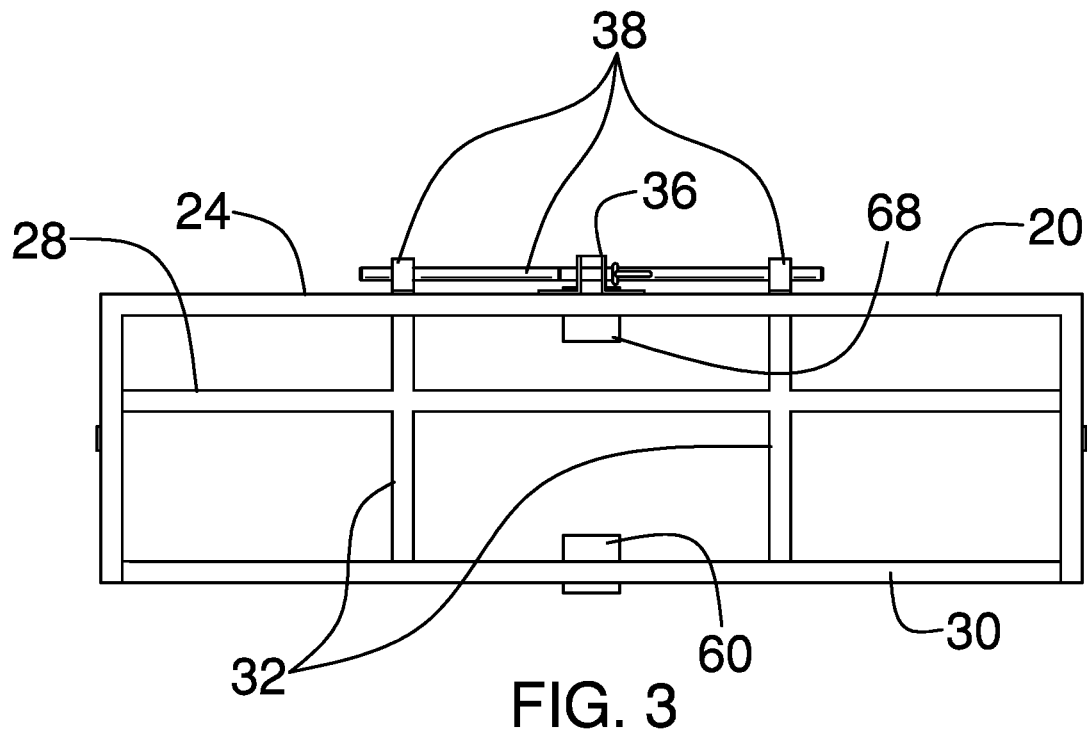
FIG. 3 is a top view of an embodiment of the disclosure.
Figure 4:
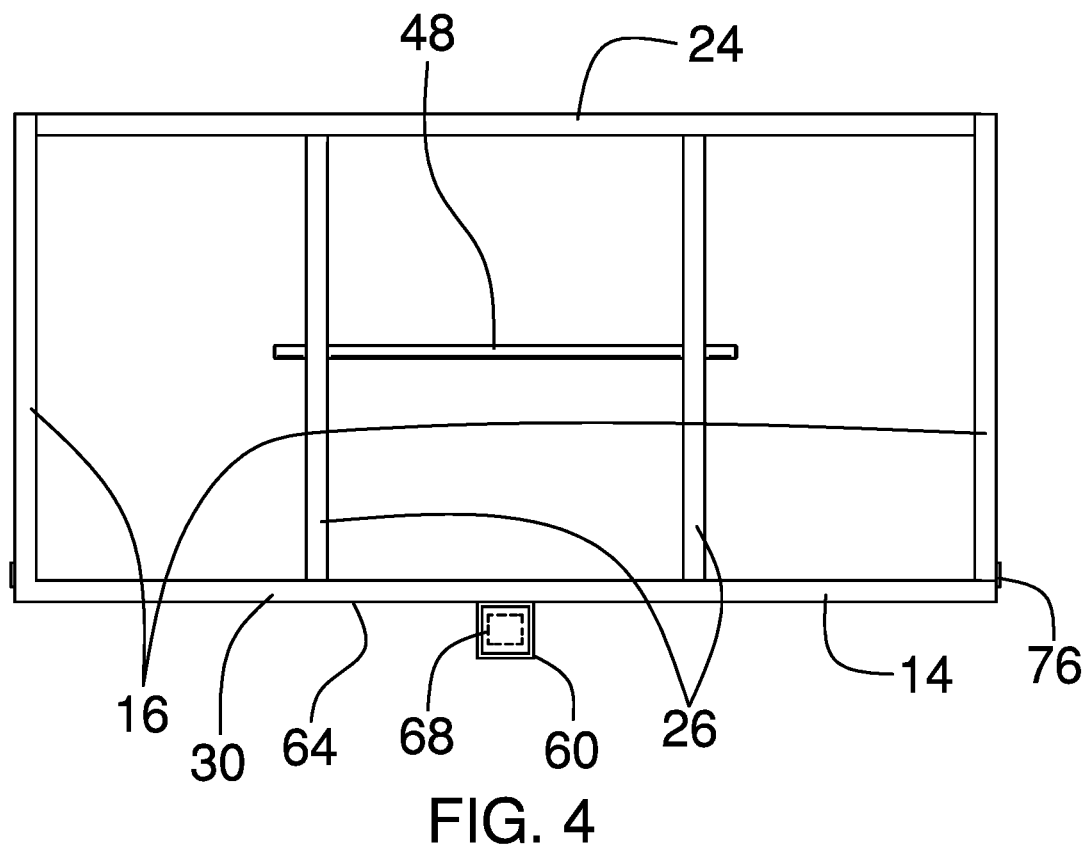
FIG. 4 is a rear view of an embodiment of the disclosure.
Figure 5:
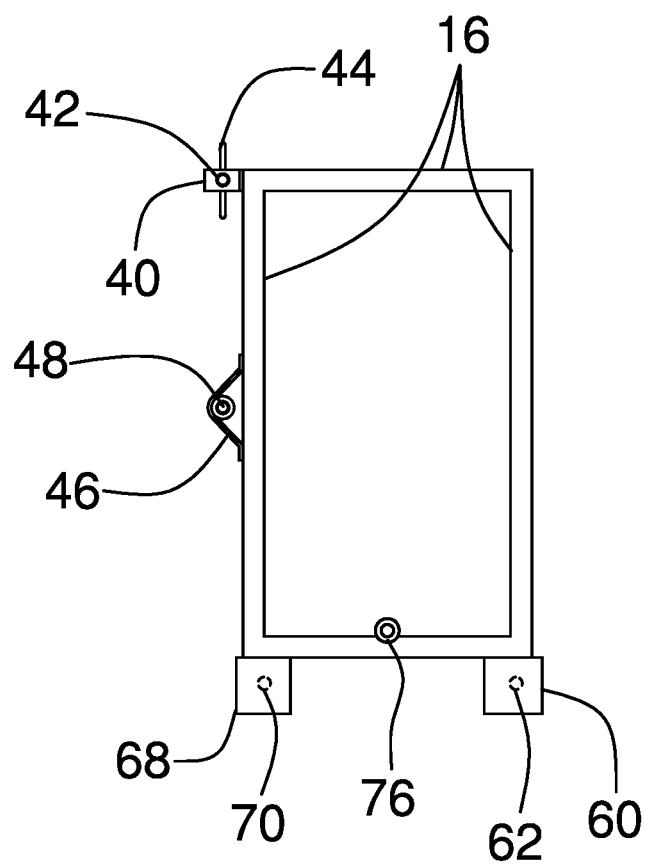
FIG. 5 is a side view of an embodiment of the disclosure.

With reference now to the drawings, and in particular to FIGS. 1 through 7 thereof, a new cargo rack assembly embodying the principles and concepts of an embodiment of the disclosure and generally designated by the reference numeral 10 will be described.

As best illustrated in FIGS. 1 through 7, the vehicle attachable cargo rack assembly 10 generally comprises a frame 12, which in turn comprises a base 14 that is rectangularly shaped. Each of a pair of end rails 16 is coupled singly to and extends perpendicularly from a respective opposing end member 18 of the base 14. A front rail 20 is coupled to a front member 22 of the base 14 and extends between the pair of end rails 16 so that the frame 12 is configured to be stacked with pieces of wood.

The front rail 20 comprises a top member 24 and a pair of vertical members 26. The top member 24 is coupled to and extends between the pair of end rails 16 distal from the base 14. Each vertical member 26 is coupled to and extends between the top member 24 and the front member 22. The pair of vertical members 26 is positioned equally distant from the opposing end members 18.

The wood could be stacked between the pair of end rails 16 with each piece of wood positioned substantially perpendicularly to the front rail 20. Longer pieces of wood could be stacked so that the longer pieces extend over the opposing end members 18. A crossmember 28 is coupled to and extends between the opposing end members 18 of the base 14. The crossmember 28, or other supporting element, such as, but not limited to, plates, grates, and the like that could be coupled to the base 14, is configured to support shorter pieces of wood that are positioned substantially perpendicularly to the front member 22 and a rear member 30 of the base 14.

Each of a pair of crossbars 32 is coupled to and extends between the front member 22 and the rear member 30 of the base 14. The pair of crossbars 32 is positioned to rigidify the base 14. The pair of crossbars 32 are positioned equally distant from the opposing end members 18.

Figure 7:
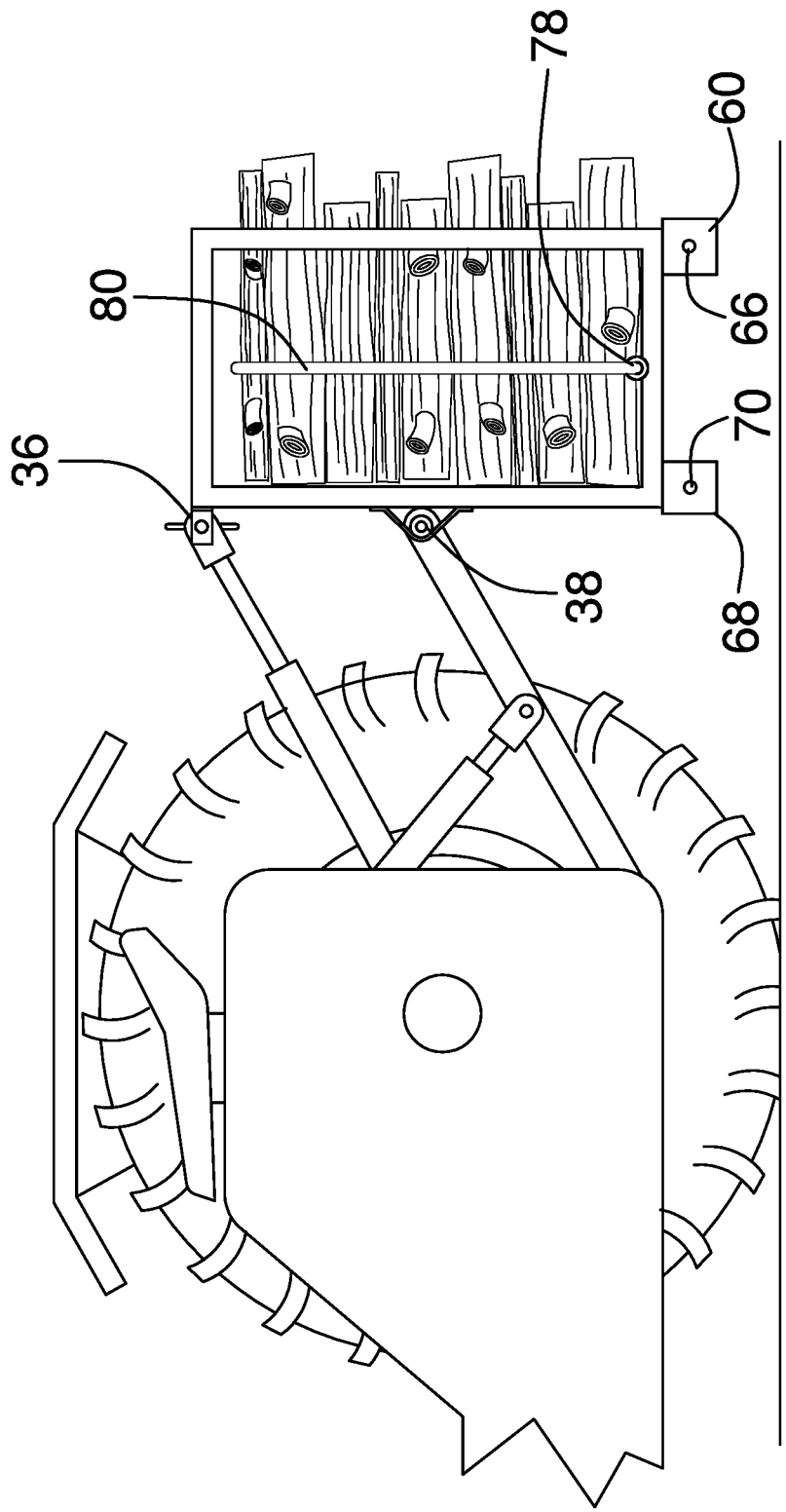
FIG. 7 is an in-use view of an embodiment of the disclosure.

A hitch attachment 34 is coupled to the front rail 20. The hitch attachment 34 is three point type so that the hitch attachment 34 is complementary to a three point hitch. The hitch attachment 34 is configured to be coupled to a three point hitch of a first type of vehicle, such as a tractor, as shown in FIG. 7, positioning a user to lift and transport the frame 12. The tractor would allow the user to transport firewood, for example, from a source to a storage area, and from the storage area to proximate to an end use site, such as a porch of a home.

The hitch attachment 34 comprises a first coupler 36 and a pair of second couplers 38. The first coupler 36 is coupled to the top member 24 of the front rail 20 equally distant from the pair of end rails 16. Each second coupler 38 is coupled to a respective vertical member 26 of the front rail 20. The first coupler 36 is configured to selectively couple to a corresponding coupler of an upper arm of the three point hitch. Each second coupler 38 is configured to selectively couple to a corresponding coupler of a respective upper arm of the three point hitch to couple the frame 12 to the vehicle. Three point hitches can be fitted with a variety of corresponding couplers, so the present invention anticipates the first coupler 36 and the pair of second couplers 38 comprising a variety of types of first couplers 36 and the pair of second couplers 38 are configured to couple to the variety of corresponding couplers of the three point hitch.

The first coupler 36 comprises a pair of tabs 40 and a pair of orifices 42, or other type of implement coupling means, such as, but not limited to, bolts, rings, and the like. Each tab 40 is coupled to and extends from the top member 24. Each orifice 42 is positioned in a respective tab 40 so that the pair of orifices 42 is configured to be aligned with a pair of corresponding orifices of the corresponding coupler of the upper arm. The pair of orifices 42 and the pair of corresponding orifices are positioned for insertion of a first pull pin 44.

The pair of second couplers 38 comprises a pair of brackets 46 and a rod 48, or other type of implement coupling means, such as, but not limited to, bolts, rings, and the like. The brackets 46 are C-shaped, with each bracket 46 being coupled to a respective vertical member 26. The rod 48 is coupled to and extends between the pair of brackets 46 so that the rod 48 is configured to couple to the corresponding couplers, such as upward facing hooks, of the upper arms of the three point hitch.

A shank 50 is coupled to the base 14 and extends from the front member 22. The shank 50 is complementary to a hitch receiver that is coupled to a second type of vehicle, such as a passenger vehicle, sport utility vehicle, pickup, ATV, and the like, so that the shank 50 is configured to be selectively coupled to the hitch receiver, positioning the user to transport the frame 12. The second type of vehicle would allow the user to transport the firewood longer distances, for example, from the storage area to a camping site.

Figure 6:
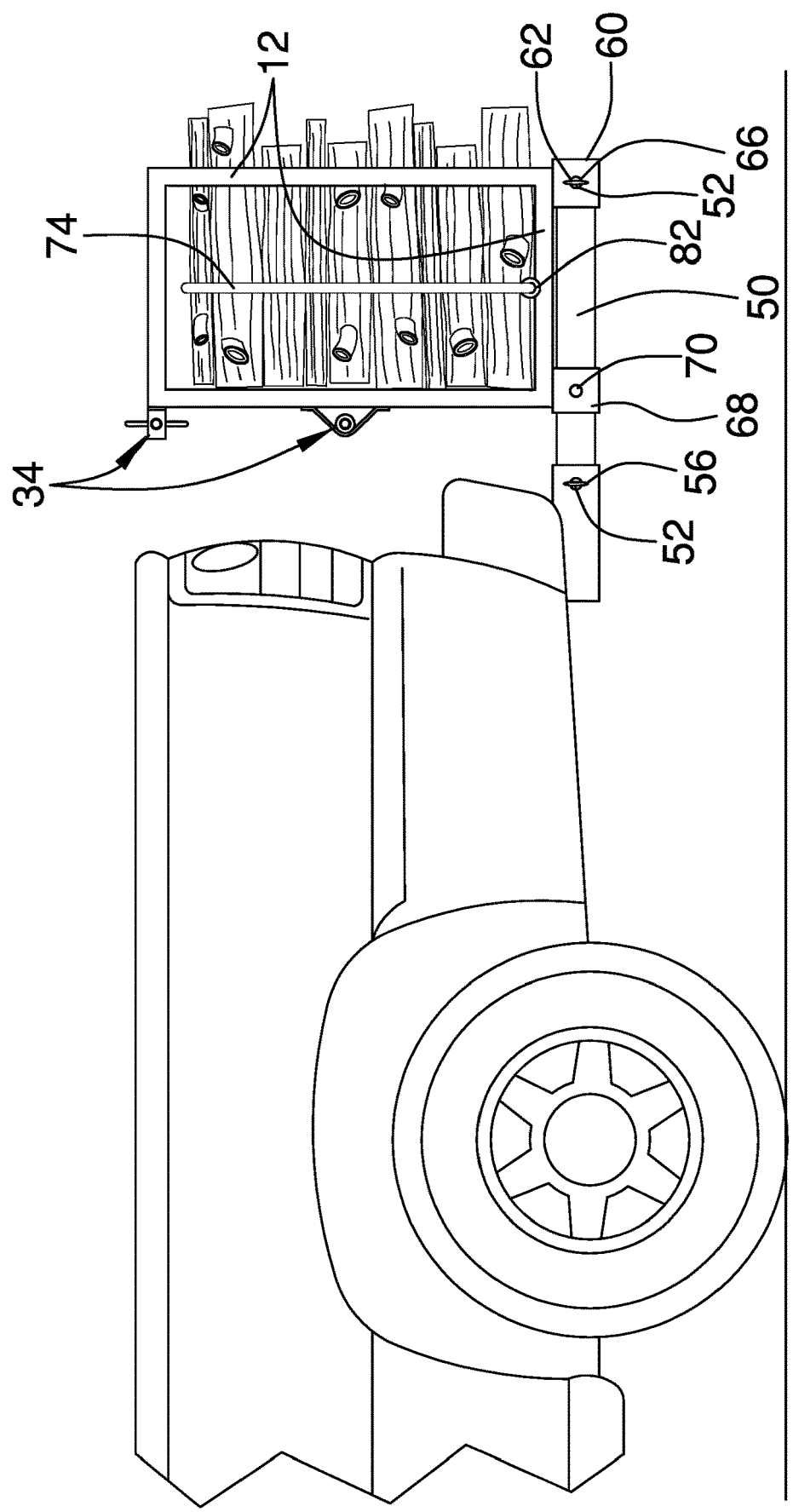
FIG. 6 is an in-use view of an embodiment of the disclosure.

The shank 50 is removably couplable to the base 14. A pair of first holes 52 is positioned in the shank 50 proximate to a respective opposing end 54 of the shank 50. The pair of first holes 52 is configured to be aligned with a matching pair of holes that is positioned in the hitch receiver. The pair of first holes 52 and the matching pair of holes is positioned for insertion of a receiver pull pin 56 to removably couple the shank 50 to the hitch receiver, as shown in FIG. 6. The pair of first holes 52 comprises two pairs of first holes 52 that are positioned in the shank 50 proximate to the opposing ends 54 of the shank 50.

A connector 58 that is coupled to the rear member 30 is configured to reversibly couple to the shank 50 to removably couple the shank 50 to the base 14, with the shank 50 extending past the front member 22 and parallel planarly with the base 14.

The connector 58 comprises a first tube 60 and a pair of first connecting holes 62. The first tube 60 is coupled to a lower face 64 of the rear member 30. The first connecting holes 62 are positioned in the first tube 60 so that the pair of first connecting holes 62 is positioned to be aligned with a respective pair of first holes 52. The pair of first connecting holes 62 and the respective pair of first holes 52 are positioned for insertion of a locking pin 66 to removably couple the shank 50 to the base 14.

A second tube 68 is coupled to the front member 22 so that the second tube 68 is aligned with the first tube 60. The shank 50 extends through the second tube 68 when the shank 50 is coupled to the first tube 60, positioning the second tube 68 is to stabilize the shank 50 relative to the frame 12.

A pair of second connecting holes 70 is positioned in the second tube 68 so that the pair of second connecting holes 70 is positioned to be aligned with a respective pair of first holes 52. The pair of second connecting holes 70 and the respective pair of first holes 52 are positioned for insertion of the locking pin 66 to removably couple the shank 50 to the base 14, with the shank 50 extending through the first tube 60 and past the rear member 30 of the base 14. In this configuration, the front member 22 is distal to a rear of the vehicle relative to the rear member 30.

A pair of fasteners 72 is coupled singly to the opposing end members 18 of the frame 12. Each fastener 72 is configured to couple to a complementary fastener 82 that is coupled to a respective opposing terminus of a strap 74 positioning the user to tighten the strap to secure the pieces of wood to the frame. Each fastener 72 may comprise a ring 76 that is configured to insert a respective hook 78 of a tie down strap 80, positioning the user to tighten the tie down strap 80 to secure the pieces of wood to the frame. The fastener 72 and the complementary fastener 82 also may comprises other complementary fastening pairs, such as, but not limited to, quick connects, buckles, snaps, and the like.

In use, the assembly 10 would be coupled to vehicle that has a three point hitch, such as a tractor, using the hitch attachment 34, to allow the user to use the frame 12 while harvesting wood and transporting the wood to a storage site. This setup also could be used to position the frame 12, with the wood stacked upon it, on a porch of a home for easy access to the wood. The assembly 10 also can be coupled to a vehicle that has a hitch receiver, such as a pickup, ATV, and the like, using the shank 50, to allow the user to transport the wood further distances, such as to a campsite.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A vehicle attachable cargo rack assembly comprising:
a frame comprising:
   a base, the base being rectangularly shaped,
   a pair of end rails coupled singly to and extending perpendicularly from opposing end members of the base,
   a front rail coupled to a front member of the base and extending between the pair of end rails wherein the frame is configured for stacking pieces of wood, the front rail comprising a top member and a pair of vertical members, the top member being coupled to and extending between the pair of end rails distal from the base, each vertical member being coupled to and extending between the top member and the front member;
a hitch attachment coupled to the front rail, the hitch attachment being three point type such that the hitch attachment is complementary to a three point hitch coupled to a first type of vehicle wherein the hitch attachment is configured for coupling to the three point hitch, positioning a user for lifting and transporting the frame; and
a shank coupled to the base and extending from the front member, the shank being complementary to a hitch receiver coupled to a second type of vehicle wherein the shank is configured for selectively coupling to the hitch receiver positioning the user for transporting the frame.

2. The assembly of claim 1, further including the pair of vertical members being positioned equally distant from the opposing end members.

3. The assembly of claim 2, further including the hitch attachment comprising a first coupler and a pair of second couplers, the first coupler being coupled to the top member of the front rail equally distant from the pair of end rails, each second coupler being coupled to a respective vertical member of the front rail wherein the first coupler is configured for selectively coupling to a corresponding coupler of an upper arm of the three point hitch and wherein each second coupler is configured for selectively coupling to a corresponding coupler of a respective upper arm of the three point hitch for coupling the frame to the vehicle.

4. The assembly of claim 3, further including the first coupler comprising a pair of tabs and a pair of orifices, each tab being coupled to and extending from the top member, each orifice being positioned in a respective tab wherein the pair of orifices is configured for aligning with a pair of corresponding orifices of the corresponding coupler of the upper arm, positioning the pair of orifices and the pair of corresponding orifices for inserting a first pull pin, the pair of second couplers comprising a pair of brackets and a rod, the brackets being C-shaped, each bracket being coupled to a respective vertical member, the rod being coupled to and extending between the pair of brackets wherein the rod is configured for coupling to the corresponding couplers of the upper arms of the three point hitch.

5. The assembly of claim 1, further including a crossmember coupled to and extending between the opposing end members of the base wherein the crossmember is configured for supporting shorter pieces of wood positioned substantially perpendicular to the front member and a rear member of the base.

6. The assembly of claim 1, further including a pair of crossbars, each crossbar being coupled to and extending between the front member and a rear member of the base such that the pair of crossbars is positioned for rigidifying the base.

7. The assembly of claim 6, further including the pair of crossbars being positioned equally distant from the opposing end members.

8. The assembly of claim 1, further including a pair of first holes positioned in the shank proximate to a respective opposing end of the shank wherein the pair of first holes is configured for aligning with a matching pair of holes positioned in the hitch receiver, positioning the pair of first holes and the matching pair of holes for inserting a receiver pull pin for removably coupling the shank to the hitch receiver.

9. The assembly of claim 8, further comprising
the shank being removably couplable to the base; and
a connector coupled to a rear member of the frame, the connector being configured for reversibly coupling to the shank for removably coupling the shank to the base with the shank extending past the front member and parallel planarly with the base.

10. A vehicle attachable cargo rack assembly comprising:
a frame comprising:
   a base, the base being rectangularly shaped,
   a pair of end rails coupled singly to and extending perpendicularly from opposing end members of the base,
   a front rail coupled to a front member of the base and extending between the pair of end rails wherein the frame is configured for stacking pieces of wood;
a hitch attachment coupled to the front rail, the hitch attachment being three point type such that the hitch attachment is complementary to a three point hitch coupled to a first type of vehicle wherein the hitch attachment is configured for coupling to the three point hitch, positioning a user for lifting and transporting the frame; and
a shank coupled to the base and extending from the front member, the shank being complementary to a hitch receiver coupled to a second type of vehicle wherein the shank is configured for selectively coupling to the hitch receiver positioning the user for transporting the frame;
a pair of first holes positioned in the shank proximate to a respective opposing end of the shank wherein the pair of first holes is configured for aligning with a matching pair of holes positioned in the hitch receiver, positioning the pair of first holes and the matching pair of holes for inserting a receiver pull pin for removably coupling the shank to the hitch receiver;
the shank being removably couplable to the base;
a connector coupled to a rear member of the frame, the connector being configured for reversibly coupling to the shank for removably coupling the shank to the base with the shank extending past the front member and parallel planarly with the base;
the pair of first holes comprising two pairs of first holes positioned in the shank proximate to the opposing ends of the shank; and
the connector comprising a first tube and a pair of first connecting holes, the first tube being coupled to a lower face of the rear member, the first connecting holes being positioned in the first tube such that the pair of first connecting holes is positioned for aligning with a respective pair of first holes positioning the pair of first connecting holes and the respective pair of first holes for inserting a locking pin for removably coupling the shank to the base.

11. The assembly of claim 10, further including a second tube coupled to the front member such that the second tube is aligned with the first tube and such that the shank extends through the second tube when coupled to the first tube such that the second tube is positioned for stabilizing the shank relative to the frame.

12. The assembly of claim 11, further including a pair of second connecting holes, the second connecting holes being positioned in the second tube such that the pair of second connecting holes is positioned for aligning with a respective pair of first holes positioning the pair of second connecting holes and the respective pair of first holes for inserting the locking pin for removably coupling the shank to the base with the shank extending through the first tube and past the rear member of the base such that the front member is distal to a rear of the vehicle relative to the rear member.

13. A vehicle attachable cargo rack assembly comprising:
a frame comprising:
a base, the base being rectangularly shaped,
a pair of end rails coupled singly to and extending perpendicularly from opposing end members of the base,
a front rail coupled to a front member of the base and extending between the pair of end rails wherein the frame is configured for stacking pieces of wood;
a hitch attachment coupled to the front rail, the hitch attachment being three point type such that the hitch attachment is complementary to a three point hitch coupled to a first type of vehicle wherein the hitch attachment is configured for coupling to the three point hitch, positioning a user for lifting and transporting the frame;
a shank coupled to the base and extending from the front member, the shank being complementary to a hitch receiver coupled to a second type of vehicle wherein the shank is configured for selectively coupling to the hitch receiver positioning the user for transporting the frame; and
a pair of fasteners coupled singly to the opposing end members of the frame wherein each fastener is configured for coupling to a complementary fastener coupled to a respective opposing terminus of a strap, positioning the user for tightening the strap for securing the pieces of wood to the frame.

14. A vehicle attachable cargo rack assembly comprising:
a frame comprising:
a base, the base being rectangularly shaped,
a pair of end rails coupled singly to and extending perpendicularly from opposing end members of the base,
a front rail coupled to a front member of the base and extending between the pair of end rails wherein the frame is configured for stacking pieces of wood;
a hitch attachment coupled to the front rail, the hitch attachment being three point type such that the hitch attachment is complementary to a three point hitch coupled to a first type of vehicle wherein the hitch attachment is configured for coupling to the three point hitch, positioning a user for lifting and transporting the frame;
a shank coupled to the base and extending from the front member, the shank being complementary to a hitch receiver coupled to a second type of vehicle wherein the shank is configured for selectively coupling to the hitch receiver positioning the user for transporting the frame; and
each fastener comprising a ring wherein the ring is configured for inserting a respective hook of a tie down strap, positioning the user for tightening the tie down strap for securing the pieces of wood to the frame.

15. A vehicle attachable cargo rack assembly comprising:
a frame comprising:
a base, the base being rectangularly shaped,
a pair of end rails coupled singly to and extending perpendicularly from opposing end members of the base, and
a front rail coupled to a front member of the base and extending between the pair of end rails wherein the frame is configured for stacking pieces of wood, the front rail comprising a top member and a pair of vertical members, the top member being coupled to and extending between the pair of end rails distal from the base, each vertical member being coupled to and extending between the top member and the front member, the pair of vertical members being positioned equally distant from the opposing end members;
a crossmember coupled to and extending between the opposing end members of the base wherein the crossmember is configured for supporting shorter pieces of wood positioned substantially perpendicular to the front member and a rear member of the base;
a pair of crossbars, each crossbar being coupled to and extending between the front member and the rear member of the base such that the pair of crossbars is positioned for rigidifying the base, the pair of crossbars being positioned equally distant from the opposing end members;
a hitch attachment coupled to the front rail, the hitch attachment being three point type such that the hitch attachment is complementary to a three point hitch coupled to a first type of vehicle wherein the hitch attachment is configured for coupling to the three point hitch, positioning a user for lifting and transporting the frame, the hitch attachment comprising a first coupler and a pair of second couplers, the first coupler being coupled to the top member of the front rail equally distant from the pair of end rails, each second coupler being coupled to a respective vertical member of the front rail wherein the first coupler is configured for selectively coupling to a corresponding coupler of an upper arm of the three point hitch and wherein each second coupler is configured for selectively coupling to a corresponding coupler of a respective upper arm of the three point hitch for coupling the frame to the vehicle, the first coupler comprising a pair of tabs and a pair of orifices, each tab being coupled to and extending from the top member, each orifice being positioned in a respective tab wherein the pair of orifices is configured for aligning with a pair of corresponding orifices of the corresponding coupler of the upper arm, positioning the pair of orifices and the pair of corresponding orifices for inserting a first pull pin, the pair of second couplers comprising a pair of brackets and a rod, the brackets being C-shaped, each bracket being coupled to a respective vertical member, the rod being coupled to and extending between the pair of brackets wherein the rod is configured for coupling to the corresponding couplers of the upper arms of the three point hitch;

a shank coupled to the base and extending from the front member, the shank being complementary to a hitch receiver coupled to a second type of vehicle wherein the shank is configured for selectively coupling to the hitch receiver positioning the user for transporting the frame, the shank being removably couplable to the base;

a pair of first holes positioned in the shank proximate to a respective opposing end of the shank wherein the pair of first holes is configured for aligning with a matching pair of holes positioned in the hitch receiver, positioning the pair of first holes and the matching pair of holes for inserting a receiver pull pin for removably coupling the shank to the hitch receiver, the pair of first holes comprising two pairs of first holes positioned in the shank proximate to the opposing ends of the shank;

a connector coupled to the rear member, the connector being configured for reversibly coupling to the shank for removably coupling the shank to the base with the shank extending past the front member and parallel planarly with the base, the connector comprising a first tube and a pair of first connecting holes, the first tube being coupled to a lower face of the rear member, the first connecting holes being positioned in the first tube such that the pair of first connecting holes is positioned for aligning with a respective pair of first holes positioning the pair of first connecting holes and the respective pair of first holes for inserting a locking pin for removably coupling the shank to the base;

a second tube coupled to the front member such that the second tube is aligned with the first tube and such that the shank extends through the second tube when coupled to the first tube such that the second tube is positioned for stabilizing the shank relative to the frame;

a pair of second connecting holes, the second connecting holes being positioned in the second tube such that the pair of second connecting holes is positioned for aligning with a respective pair of first holes positioning the pair of second connecting holes and the respective pair of first holes for inserting the locking pin for removably coupling the shank to the base with the shank extending through the first tube and past the rear member of the base such that the front member is distal to a rear of the vehicle relative to the rear member; and a pair of fasteners coupled singly to the opposing end members of the frame wherein each fastener is configured for coupling to a complementary fastener coupled to a respective opposing terminus of a strap, positioning the user for tightening the strap for securing the pieces of wood to the frame, each fastener comprising a ring wherein the ring is configured for inserting a respective hook of a tie down strap, positioning the user for tightening the tie down strap for securing the pieces of wood to the frame.

* * * * *